(12) United States Patent
Li et al.

(10) Patent No.: US 11,170,518 B2
(45) Date of Patent: Nov. 9, 2021

(54) INSPECTION DEVICE FOR GENERATING HEIGHT DATA OF A MEASUREMENT TARGET

(71) Applicant: Keyence Corporation, Osaka (JP)

(72) Inventors: Xing Li, Osaka (JP); Toshihiro Konaka, Osaka (JP); Naoyuki Nakamura, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 116 days.

(21) Appl. No.: 16/727,957

(22) Filed: Dec. 27, 2019

(65) Prior Publication Data

US 2020/0258244 A1  Aug. 13, 2020

(30) Foreign Application Priority Data

Feb. 8, 2019  (JP) .............................. JP2019-021806

(51) Int. Cl.
| | |
|---|---|
| *G06T 7/586* | (2017.01) |
| *G06T 7/50* | (2017.01) |
| *G01B 11/25* | (2006.01) |
| *G06T 1/00* | (2006.01) |
| *G01B 11/06* | (2006.01) |

(Continued)

(52) U.S. Cl.
CPC .............. *G06T 7/586* (2017.01); *G01B 11/02* (2013.01); *G01B 11/0608* (2013.01); *G01B 11/25* (2013.01); *G06T 1/0007* (2013.01); *G06T 7/50* (2017.01); *G06T 1/60* (2013.01)

(58) Field of Classification Search
CPC ......... G06T 7/586; G06T 7/50; G06T 1/0007; G06T 1/60
See application file for complete search history.

(56) References Cited

U.S. PATENT DOCUMENTS

| | | | | |
|---|---|---|---|---|
| 6,181,833 B1* | 1/2001 | Kuwabara | .............. | H04N 1/393 358/451 |
| 2011/0002529 A1* | 1/2011 | Jeong | ..................... | G06T 7/001 382/147 |
| 2018/0255307 A1* | 9/2018 | Douady-Pleven | ........ | G06T 1/60 |

FOREIGN PATENT DOCUMENTS

JP            2015045587 A       3/2015

OTHER PUBLICATIONS

U.S. Appl. No. 16/727,960, filed Dec. 27, 2019 (61 pages).
U.S. Appl. No. 16/727,961, filed Dec. 27, 2019 (68 pages).

* cited by examiner

*Primary Examiner* — Casey L Kretzer
(74) *Attorney, Agent, or Firm* — Kilyk & Bowersox, P.L.L.C.

(57) ABSTRACT

An imaging processing part 131 executes first imaging processing of causing a first illuminating part to emit structured light from a first direction to a measurement target, causing an imaging part 120 to generate image data, and causing a buffer memory 133 to store therein the generated image data. A computing processing part 132 executes first computing processing of generating, height data corresponding to the first direction. Concurrently with the first computing processing, the imaging processing part 131 executes second imaging processing of causing the second illuminating part to emit structured light from a second direction to the measurement target, causing the imaging part 120 to generate image data, and causing a buffer memory 134 to store therein the generated image data. The computing processing part 132 executes second computing processing of generating height data corresponding to the second direction.

8 Claims, 14 Drawing Sheets

(51) Int. Cl.
*G01B 11/02* (2006.01)
*G06T 1/60* (2006.01)

FIG. 6A
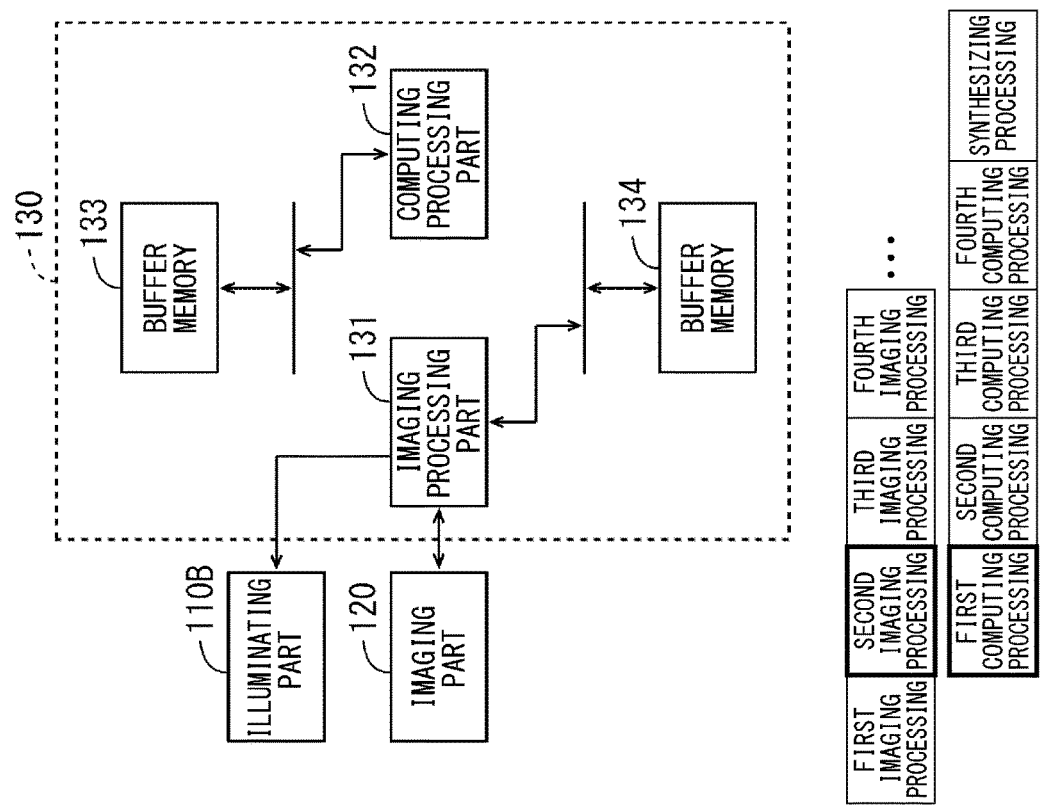
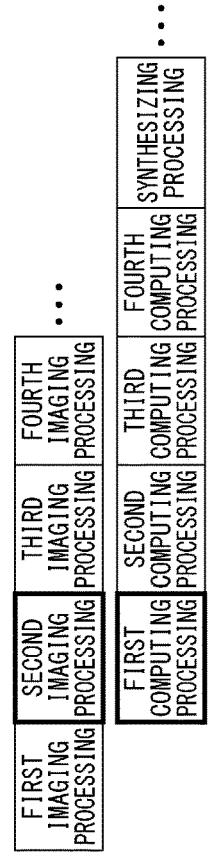
FIG. 6B
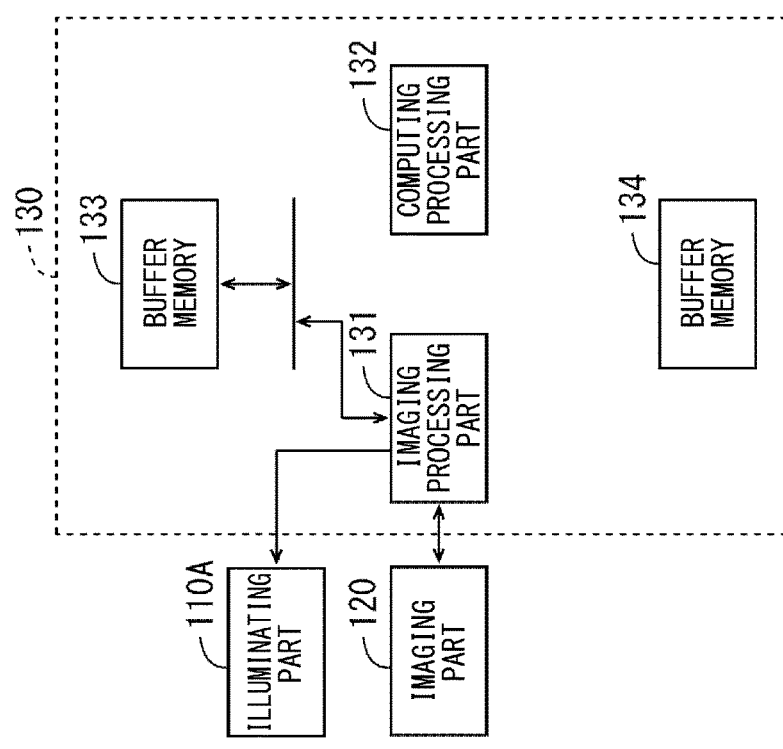
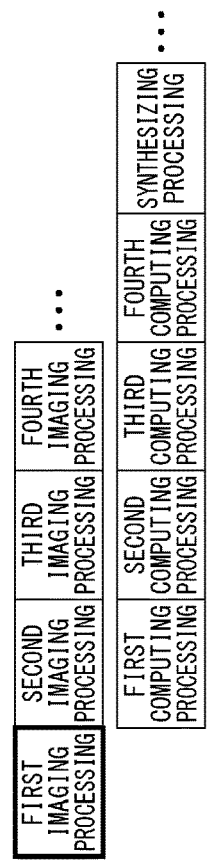

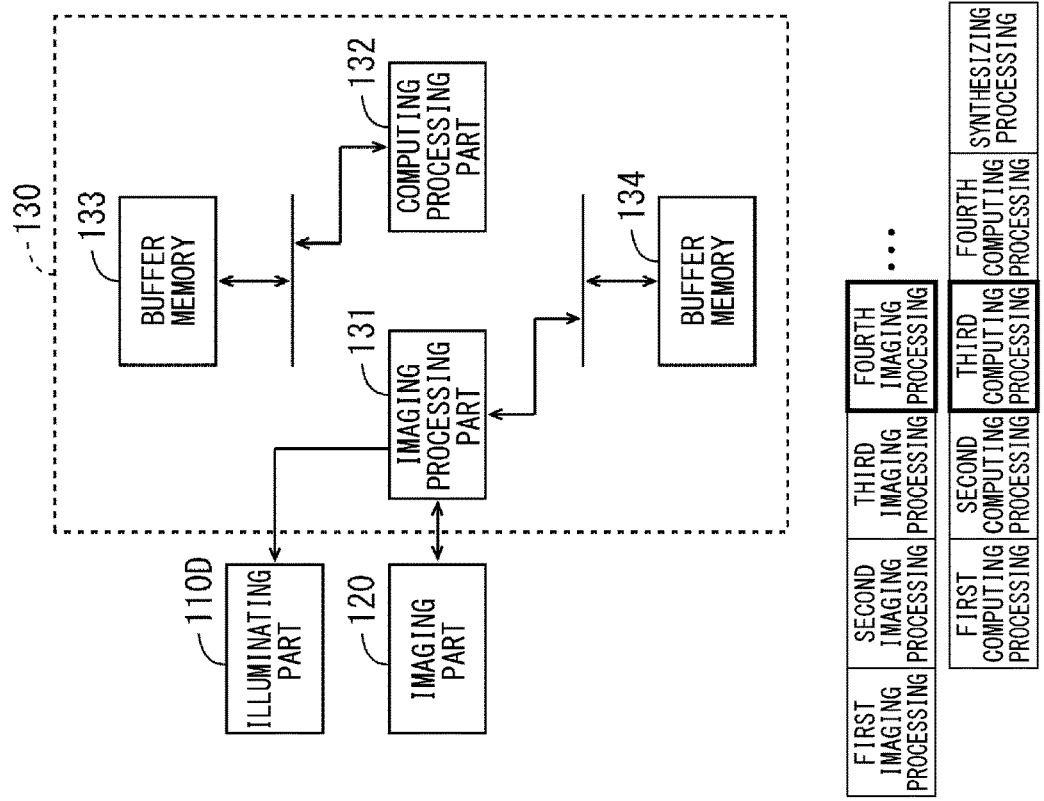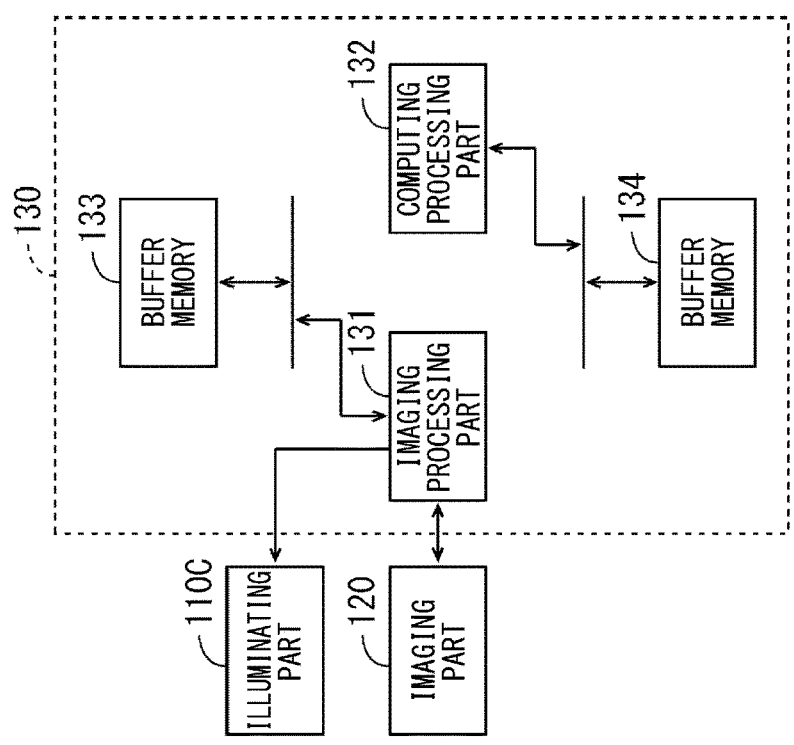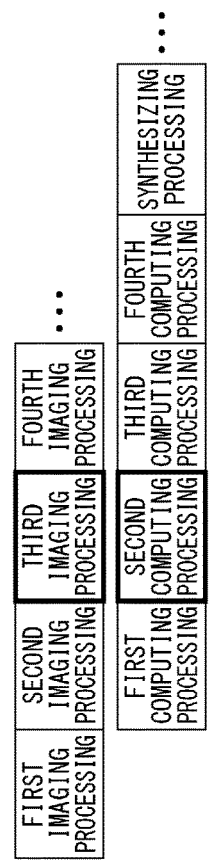

FIG. 8A
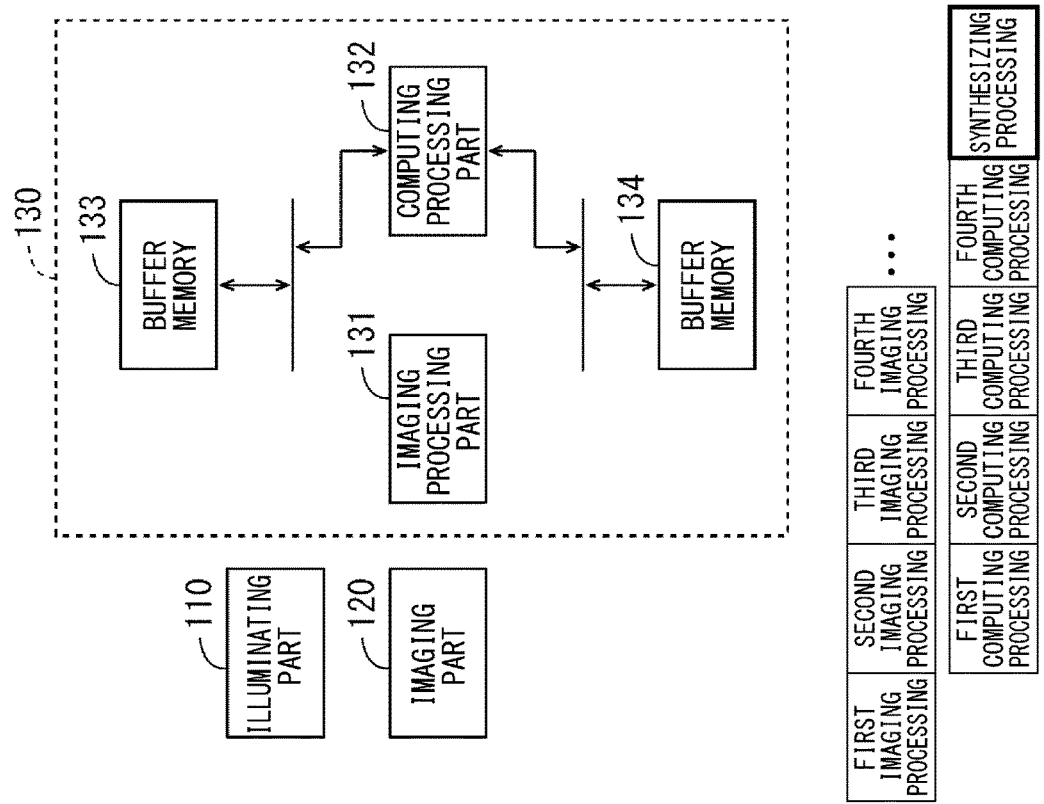
FIG. 8B
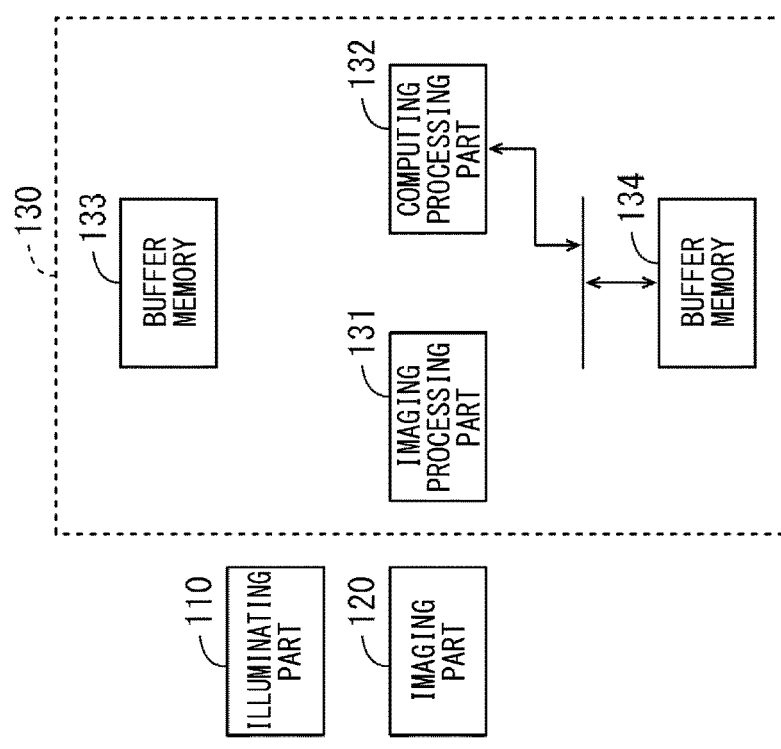
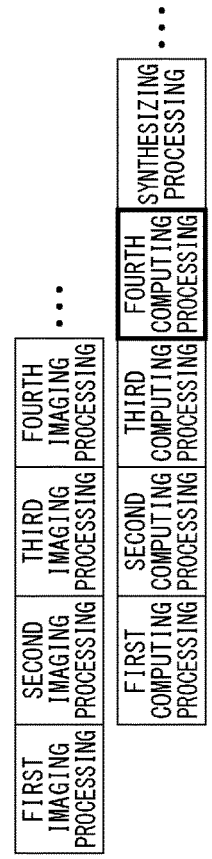

INSPECTION DEVICE FOR GENERATING HEIGHT DATA OF A MEASUREMENT TARGET

CROSS-REFERENCE TO RELATED APPLICATIONS

The present application claims foreign priority based on Japanese Patent Application No. 2019-021806, filed Feb. 8, 2019, the contents of which is incorporated herein by reference.

BACKGROUND OF THE INVENTION

1. Field of the Invention

The present invention relates to an inspection device that inspects the height of a measurement target.

2. Description of Related Art

In an inspection device of a triangulation method, a light projecting part irradiates a surface of a measurement target with light, and a light receiving part including one-dimensionally or two-dimensionally arranged pixels receives the reflected light. Height data indicating a height image of the measurement target is generated on the basis of data on a received light amount distribution that is obtained by the light receiving part. Such height data is used in order to inspect (in-line inspect) the height of produced measurement targets in production sites such as factories in some cases.

For example, in a three-dimensional image processing device of JP-A-2015-45587, a measurement target is conveyed by a belt conveyor, and a light projection unit irradiates the measurement target with light many times at a prescribed position. Moreover, an imaging part receives each reflected light from the measurement target, whereby the measurement target is imaged.

Height data (height image) on the measurement target is generated on the basis of a plurality of pieces of image data on the measurement target.

In the abovementioned in-line inspection, in a state where the conveyance of the measurement targets by the belt conveyor is stopped in a certain period of time so as to bring the measurement target to a standstill at a prescribed position, the measurement target is irradiated by light many times, and the measurement target is imaged many times, whereby height data is generated. Here, when a long period of time is required to generate height data, the stop time of the conveyance of the measurement targets becomes longer, and the production efficiency of the measurement targets is lowered. Accordingly, an inspection device capable of generating height data in a short time is desired.

SUMMARY OF THE INVENTION

An object of the present invention is to provide an inspection device capable of generating height data in a short time.

(1) An inspection device according to the present invention includes: a first illuminating part configured to irradiate a measurement target with structured light from a first direction; a second illuminating part configured to irradiate the measurement target with structured light from a second direction different from the first direction; an imaging part configured to generate, by receiving light reflected from the measurement target, image data indicating an image of the measurement target; and a computing part configured to generate, on the basis of the image data generated by the imaging part, height data indicating a height image of the measurement target, in which the computing part includes an imaging processing part, a computing processing part, a first buffer memory, and a second buffer memory, the imaging processing part executes first imaging processing of causing the first illuminating part to emit structured light, the imaging part to generate image data, and the first buffer memory to store therein the generated image data, the computing processing part executes first computing processing of generating, by performing a computation related to the image data stored in the first buffer memory in the first imaging processing, first height data as height data corresponding to the first direction, the imaging processing part executes second imaging processing of causing the second illuminating part to emit structured light, causing the imaging part to generate image data, and causing the second buffer memory to store therein the generated image data, concurrently with the first computing processing, and the computing processing part executes second computing processing of generating, by performing a computation related to the image data stored in the second buffer memory in the second imaging processing, second height data as height data corresponding to the second direction.

In this inspection device, the first and second illuminating parts respectively irradiate the measurement target with the structured light from the mutually different first and second directions. Moreover, by receiving the light having reflected by the measurement target, the imaging part generates image data indicating an image of the measurement target. The computing part generates, on the basis of the image data generated by the imaging part, height data indicating a height image of the measurement target.

In the computing part, the first illuminating part executes first imaging processing of causing the imaging processing part to emit structured light, causing the imaging part to generate image data, and causing the first buffer memory to store therein the generated image data. The computing processing part executes first computing processing of generating, by performing a computation related to the image data stored in the first buffer memory in the first imaging processing, first height data as height data corresponding to the first direction.

Moreover, in the computing part, the imaging processing part executes second imaging processing of causing the second illuminating part to emit structured light, causing the imaging part to generate image data, and causing the second buffer memory to store therein the generated image data, concurrently with the first computing processing. The computing processing part executes second computing processing of generating, by performing a computation related to the image data stored in the second buffer memory in the second imaging processing, second height data as height data corresponding to the second direction.

With this configuration, the first computing processing and the second imaging processing are concurrently executed. Moreover, the first computing processing and the second imaging processing are executed respectively using the different first and second buffer memories, so that the processing speed of each of the imaging processing part and the computing processing part is not lowered. Therefore, it is possible to generate height data in a short time.

(2) The imaging processing part may include a data reducing part configured to reduce a data amount of the image data generated by the imaging part in the first or second imaging processing, and the data reducing part may cause the first buffer memory to store therein the image data with the reduced data amount in the first imaging processing, and cause the second buffer memory to store therein the image data with the reduced data amount in the second imaging processing.

In this case, the data amount is reduced, so that the transfer time of the image data to the first or second buffer memory is shortened. Moreover, the speed-up computation related to the image data is attained. Therefore, it is possible to generate height data in a shorter time.

(3) The imaging processing part may further include an auxiliary computing processing part, and the auxiliary computing processing part may generate a part of the first height data, by performing a computation related to the image data stored in the first buffer memory and with the reduced data amount in the first imaging processing, and generate a part of the second height data, by performing a computation related to the image data stored in the second buffer memory and with the reduced data amount in the second imaging processing.

In this case, the transfer time of the image data to the first or second buffer memory is shortened, so that the imaging processing part can generate a part of the first or second height data by the auxiliary computing processing part, during the standby time of the transfer of the image data from the imaging part. Accordingly, the computing processing part does not need to generate the part of the first or second height data. Therefore, it is possible to generate height data in a further shorter time.

(4) The computing processing part may further execute synthesizing processing of generating synthesized height data with a reduced unmeasurable portion, by synthesizing the first height data and the second height data. In this case, it is possible to easily inspect a portion over the wide range of the measurement target, using the synthesized height data.

(5) The inspection device may further include: a third illuminating part configured to irradiate the measurement target with structured light from a third direction different from the first and second directions; and a fourth illuminating part configured to irradiate the measurement target with structured light from a fourth direction different from the first, second, and third directions, in which the imaging processing part may execute third imaging processing of causing the third illuminating part to emit structured light, causing the imaging part to generate image data, and causing the first buffer memory to store therein the generated image data, concurrently with the second computing processing, and the computing processing part may execute third computing processing of generating, by performing a computation related to the image data stored in the first buffer memory in the third imaging processing, third height data as height data corresponding to the third direction, the imaging processing part may execute fourth imaging processing of causing the fourth illuminating part to emit structured light, causing the imaging part to generate image data, and causing the second buffer memory to store therein the generated image data, concurrently with the third computing processing, and the computing processing part may execute fourth computing processing of generating, by performing a computation related to the image data stored in the second buffer memory in the fourth imaging processing, fourth height data as height data corresponding to the fourth direction.

In this case, the second computing processing and the third imaging processing are further concurrently executed, and the third computing processing and the fourth imaging processing are further concurrently executed. Moreover, the second computing processing and the third imaging processing are executed respectively using the different second and first buffer memories, and the third computing processing and the fourth imaging processing are executed respectively using the different first and second buffer memories. Accordingly, the processing speed of each of the imaging processing part and the computing processing part is not lowered. Therefore, it is possible to generate a larger number of height data in a short time.

(6) The computing processing part may further execute synthesizing processing of generating synthesized height data with a reduced unmeasurable portion, by synthesizing the first height data, the second height data, the third height data, and the fourth height data. In this case, it is possible to easily inspect a portion over the wide range of the measurement target, using the synthesized height data.

(7) The computing processing part may execute a part of the synthesizing processing before the fourth imaging processing, and execute the remaining part of the synthesizing processing after the fourth imaging processing. Also in this case, it is possible to generate synthesized height data.

(8) The computing processing part may cause the second buffer memory to store therein the first height data stored in the first buffer memory, and execute a part of the synthesizing processing using the first height data and the second height data stored in the second buffer memory, and the imaging processing part may execute the third imaging processing that uses the first buffer memory, concurrently with the second computing processing and the part of the synthesizing processing that use the second buffer memory.

In this case, the second computing processing and a part of the synthesizing processing, and the third imaging processing are concurrently executed. Moreover, the second computing processing and the part of the synthesizing processing, and the third imaging processing are executed respectively using the different second and first buffer memories, so that the processing speed of each of the imaging processing part and the computing processing part is not lowered. Therefore, it is possible to generate synthesized height data in a short time.

According to the present invention, height data can be generated in a short time.

BRIEF DESCRIPTION OF THE DRAWINGS

FIGS. 6A and 6B are diagrams for explaining an operation of the computing part;

FIGS. 7A and 7B are diagrams for explaining the operation of the computing part;

FIGS. 8A and 8B are diagrams for explaining the operation of the computing part;

DESCRIPTION OF EMBODIMENTS

An inspection device according to embodiments of the present invention is explained below with reference to the drawings.

[1] First Embodiment

(1) Configuration of Inspection Device

Figure 1:
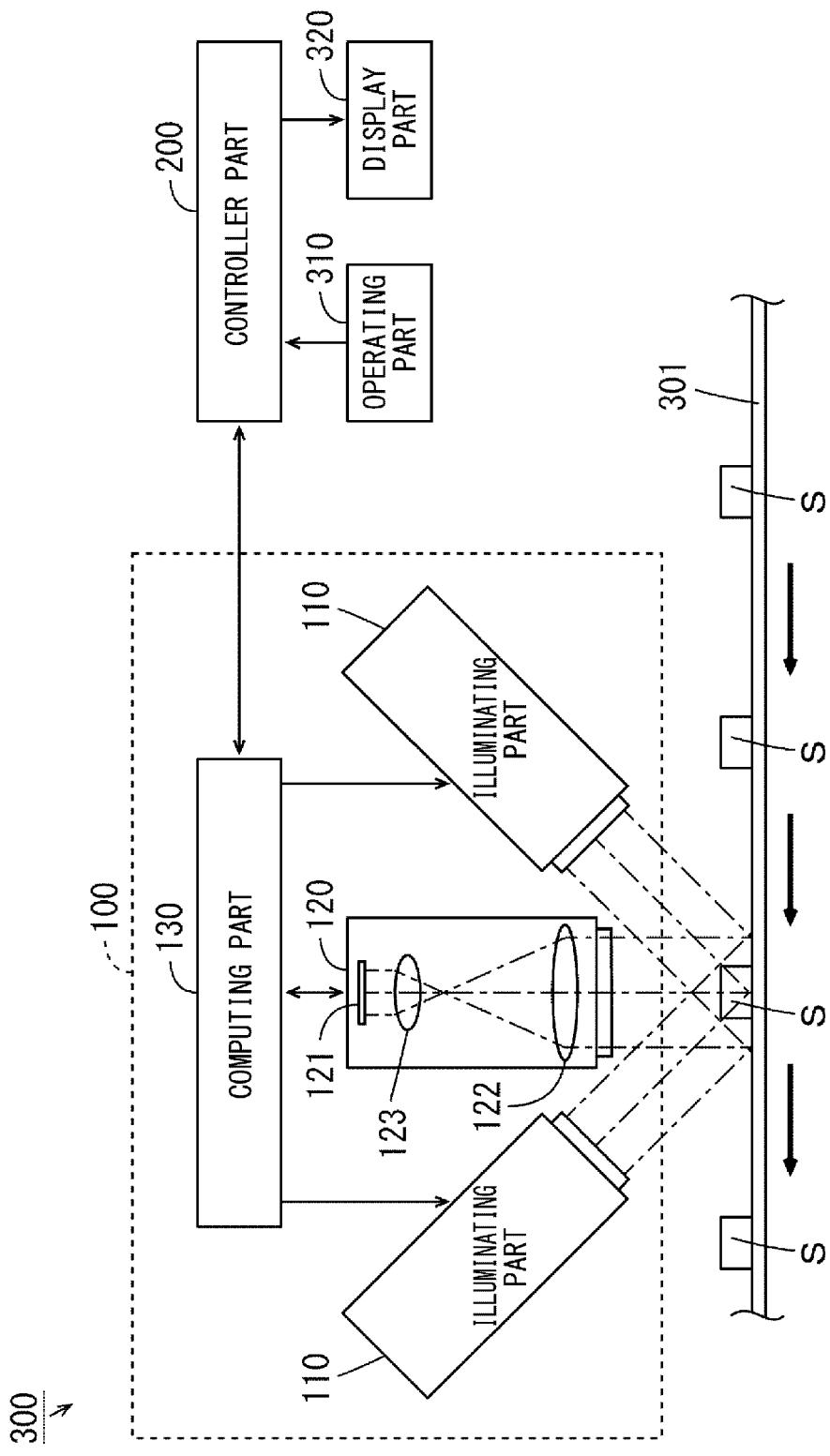
FIG. 1 is a block diagram illustrating a configuration of an inspection device according to a first embodiment of the present invention.
Figure 2:
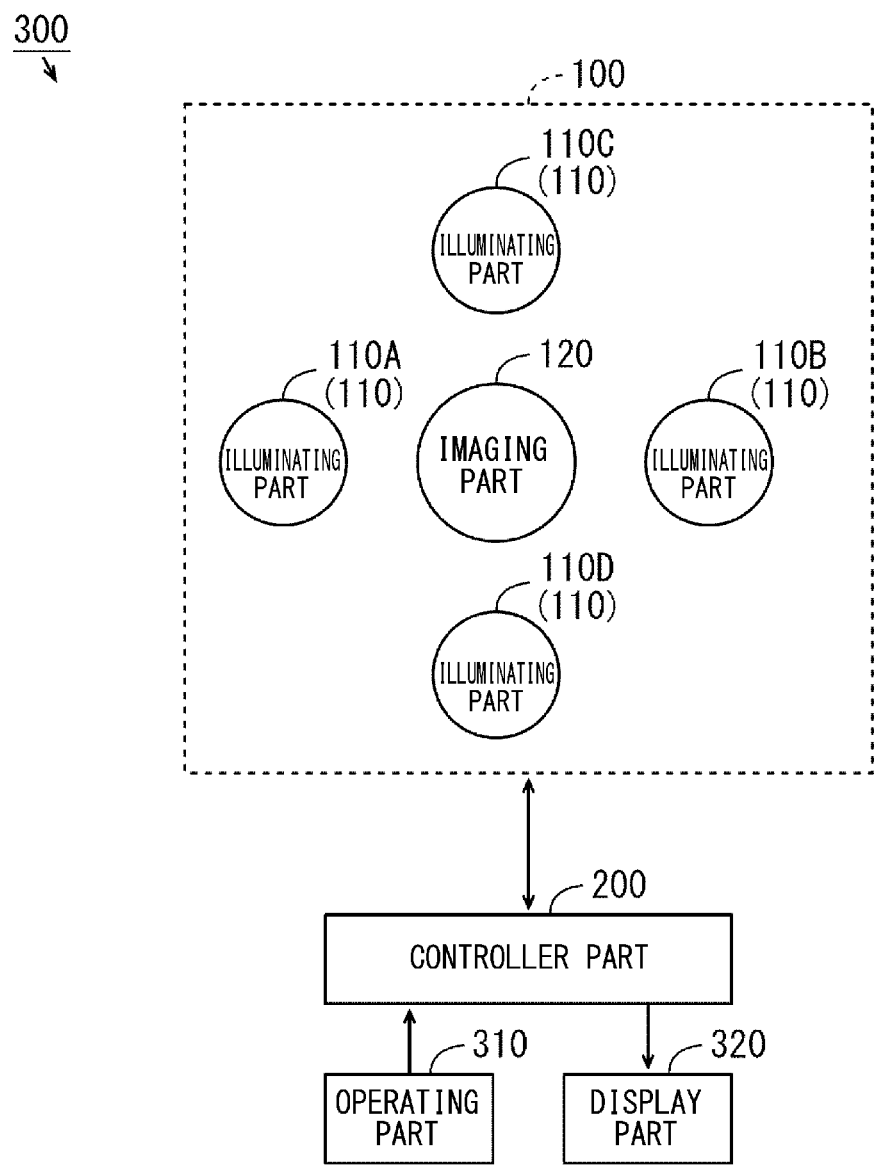
FIG. 2 is a block diagram illustrating the configuration of the inspection device according to the first embodiment of the present invention.

FIGS. 1 and 2 are block diagrams illustrating a configuration of an inspection device according to a first embodiment of the present invention. As illustrated in FIG. 1 and FIG. 2, an inspection device 300 is provided with a head part 100, a controller part 200, an operating part 310, and a display part 320. As thick arrows illustrate in FIG. 1, a plurality of measurement targets S are successively conveyed by a belt conveyor 301 so as to pass through a space below the head part 100. When each of the measurement targets S passes through the space below the head part 100, the belt conveyor 301 stops in a certain period of time such that the relevant measurement target S temporarily halts at a prescribed position below the head part 100.

The head part 100 is, for example, a light-emitting and light-receiving integrated imaging device, and includes a plurality of illuminating parts 110, an imaging part 120, and a computing part 130. Note that, in FIG. 2, the illustration of the computing part 130 is omitted. In the present embodiment, the four illuminating parts 110 are provided at intervals of 90 degrees so as to surround the imaging part 120 (see FIG. 2).

Each of the illuminating parts 110 is configured to allow irradiation of light having an arbitrary pattern (hereinafter, referred to as structured light) to the measurement target S from an obliquely upward direction. In the following explanation, when the four illuminating parts 110 are distinguished from one another, the four illuminating parts 110 are respectively referred to as illuminating parts 110A, 110B, 110C, and 110D. The illuminating part 110A and the illuminating part 110B face each other by sandwiching the imaging part 120 therebetween, and the illuminating part 110C and the illuminating part 110D face each other by sandwiching the imaging part 120 therebetween. The configuration of the illuminating part 110 is described later.

The imaging part 120 includes an imaging element 121, and light receiving lenses 122 and 123. The light reflected upward by the measurement target S is condensed and image-formed by the light receiving lenses 122 and 123 of the imaging part 120, and is thereafter received by the imaging element 121. The imaging element 121 is, for example, a monochrome charge coupled device (CCD), and outputs analog electric signals corresponding to the light receiving amount from respective pixels, thereby generating image data. The imaging element 121 may be another imaging element such as a complementary metal oxide semiconductor (CMOS) image sensor.

The computing part 130 controls operations of the respective illuminating parts 110 and the imaging part 120, and generates height data indicating a height image of the measurement target S, on the basis of a plurality of pieces of image data generated by the imaging part 120. In the present embodiment, the computing part 130 is implemented by a field programmable gate array (FPGA), for example. Details of the computing part 130 are described later.

The controller part 200 executes processing, such as edge detection or size measurement, with respect to height data generated by the computing part 130, on the basis of an inspection content specified by a user. Moreover, the controller part 200 compares a measured value with a prescribed threshold, thereby inspecting the quality of the measurement target S.

The operating part 310 and the display part 320 are connected to the controller part 200. The operating part 310 includes a key board, a pointing device, or a dedicated console. As a pointing device, a mouse, a joystick, or the like is used. The user can specify a desired inspection content to the controller part 200 by operating the operating part 310.

The display part 320 includes, for example, a liquid crystal display (LCD) panel or an organic electroluminescent (EL) panel. The display part 320 displays, on the basis of the control by the controller part 200, a height image based on the height data generated by the computing part 130. Moreover, the display part 320 displays an inspection result of the measurement target S by the controller part 200.

Figure 3:
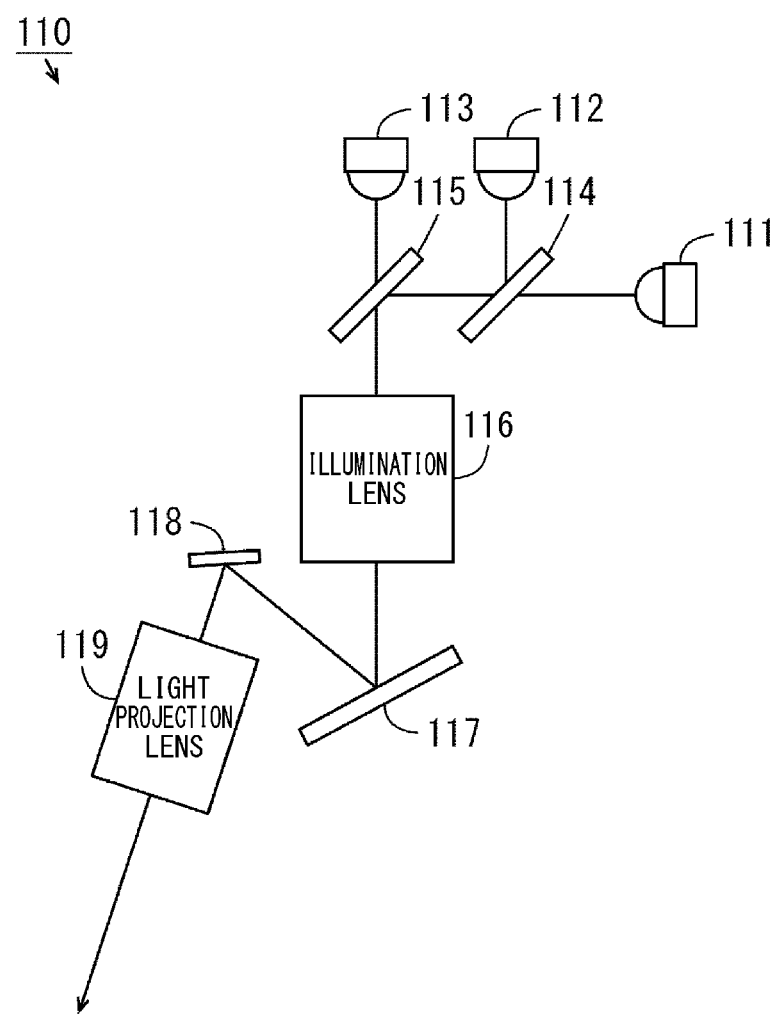
FIG. 3 is a diagram illustrating one example of a configuration of each illuminating part in FIG. 1.

FIG. 3 is a diagram illustrating one example of the configuration of each of the illuminating parts 110 in FIG. 1. As illustrated in FIG. 3, each of the illuminating parts 110 includes light sources 111, 112, and 113, dichroic mirrors 114 and 115, an illumination lens 116, a mirror 117, a pattern generating part 118, and a light projection lens 119. The light sources 111, 112, and 113 are, for example, light emitting diodes (LEDs), and respectively emit green light, blue light, and red light. Each of the light sources 111 to 113 may be a light source other than the LED.

The dichroic mirror 114 is disposed so as to allow the green light emitted by the light source 111 and the blue light emitted by the light source 112 to be superimposed on each other. The dichroic mirror 115 is disposed so as to allow the light superimposed by the dichroic mirror 114 and the red light emitted by the light source 113 to be superimposed on each other. This superimposes the light respectively emitted by the light sources 111 to 113 on a common optical path, which allows white light to be generated.

The illumination lens 116 condenses light passed through or reflected from the dichroic mirror 115. The mirror 117 reflects the light condensed by the illumination lens 116 onto the pattern generating part 118. The pattern generating part 118 is, for example, a digital micro-mirror device (DMD), and applies an arbitrary pattern to the entered light. The pattern generating part 118 may be an LCD or a reflective liquid crystal element (LCOS). The light projection lens 119 makes the light from the pattern generating part 118 parallel, and irradiates the measurement target S in FIG. 1 with the light.

The computing part 130 in FIG. 1 controls the emission of light from the light sources 111 to 113, and controls a pattern to be applied to the light by the pattern generating part 118. This allows the illuminating part 110 to emit structured light of white.

(2) Generation of Height Data

In the inspection device 300, a unique three-dimensional coordinate system (hereinafter, referred to as a device coordinate system) is defined to the head part 100. The device coordinate system in this example includes an origin point, and an X axis, a Y axis, and a Z axis that are orthogonal to one another. In the following explanation, a direction parallel to the X axis of the device coordinate system is referred to as an X direction, a direction parallel to the Y axis thereof is referred to as a Y direction, and a direction parallel to the Z axis thereof is referred to as a Z direction. The X direction and the Y direction are orthogonal to each other in a plane parallel to a top face (hereinafter, referred to as reference plane) of the belt conveyor 301. The Z direction is orthogonal to the reference plane.

Figure 4:
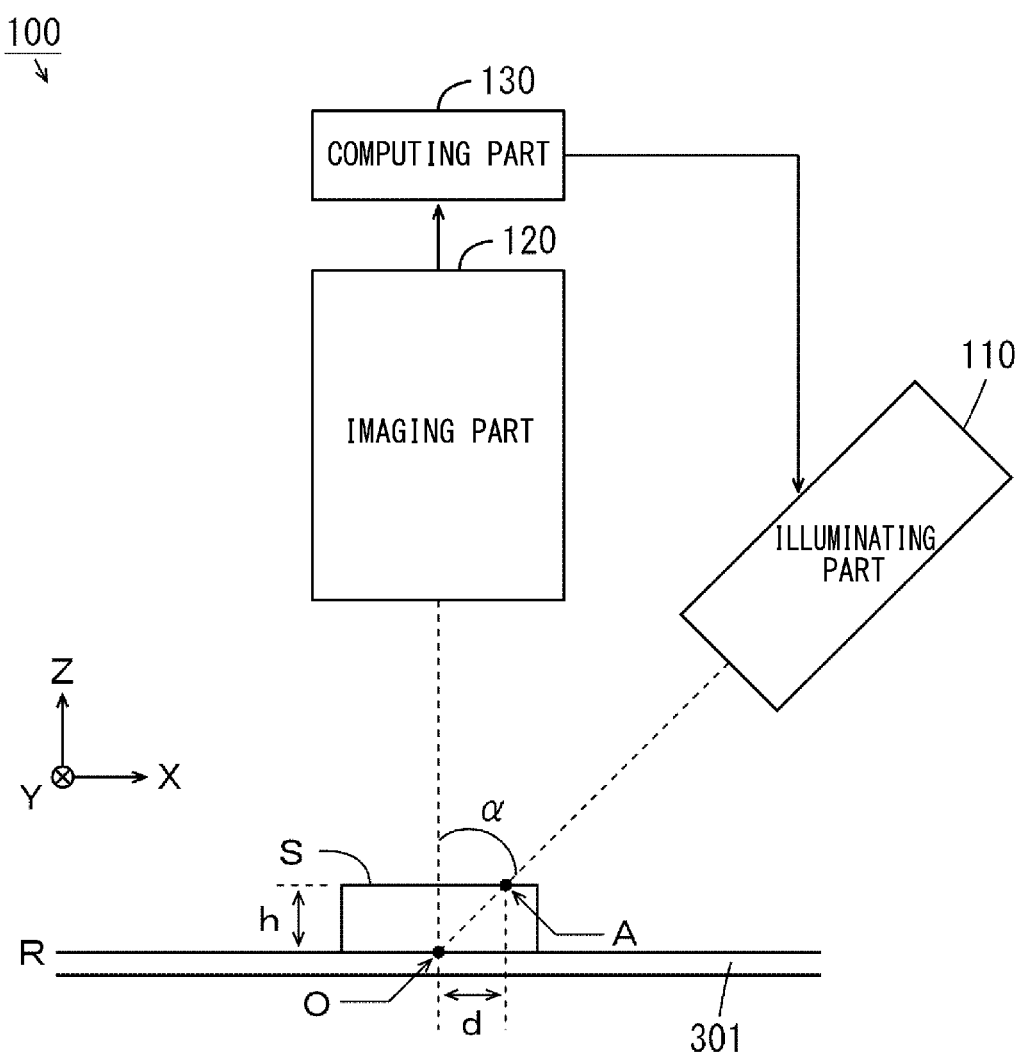
FIG. 4 is a diagram for explaining a principle of a triangulation method.

In the head part 100, height data indicating a height image of the measurement target S is generated by the triangulation method. FIG. 4 is a diagram for explaining a principle of the triangulation method. In FIG. 4, the X direction, the Y direction, and the Z direction are respectively illustrated as arrows. As illustrated in FIG. 4, an angle α between an optical axis of light that is emitted from the illuminating part 110 and an optical axis of light that enters the imaging part 120 is set in advance. The angle α is larger than 0 degree and smaller than 90 degrees.

When no measurement target S is present below the head part 100, the light that is emitted from the illuminating part 110 is reflected by a point O on a reference plane R, and enters the imaging part 120. In contrast, when the measurement target S is present below the head part 100, the light that is emitted from the illuminating part 110 is reflected by a point A on a surface of the measurement target S, and enters the imaging part 120. This causes the measurement target S to be imaged, and image data indicating an image of the measurement target S to be generated.

When a distance between the point O and the point A in the X direction is set as d, a height h of the point A in the measurement target S relative to the reference plane R is given by h=d÷tan(α). The computing part 130 calculates the distance d on the basis of the image data generated by the imaging part 120. Moreover, the computing part 130 calculates the height h of the point A on the surface of the measurement target S, on the basis of the calculated distance d. By calculating heights of all the points on the surface of the measurement target S, it is possible to identify coordinates, which are indicated by the device coordinate system, for all the points to which the light has been irradiated. With the identification, height data of the measurement target S is generated.

In order to irradiate all the points on the surface of the measurement target S with light, various types of structured light are emitted from each of the illuminating parts 110. In the present embodiment, each of the illuminating parts 110 emits, a plurality of times, striped structured light (hereinafter, referred to as striped light) having linear cross-sections that are parallel to the Y direction and arranged in the X direction while a spatial phase thereof being changed. Moreover, each of the illuminating parts 110 emits, a plurality of times, coded structured light (hereinafter, referred to as coded light) having linear cross-sections that are parallel to the Y direction and having bright portions and dark portions being arranged in the X direction, while the bright portions and the dark portions being changed to gray coded portions.

Moreover, in the present embodiment, the plurality of illuminating parts 110 can emit light with respect to the measurement target S from mutually different plurality of (four, in the present example) directions. Accordingly, even when an unmeasurable portion by the light that is emitted from any of the illuminating parts 110 is present, a shape of the unmeasurable portion can be measured by the light that is emitted from another illuminating part 110. Therefore, by synthesizing height data corresponding to the plurality of the illuminating parts 110, it is possible to generate synthesized height data with the reduced unmeasurable portion.

(3) Computing Part

Figure 5:
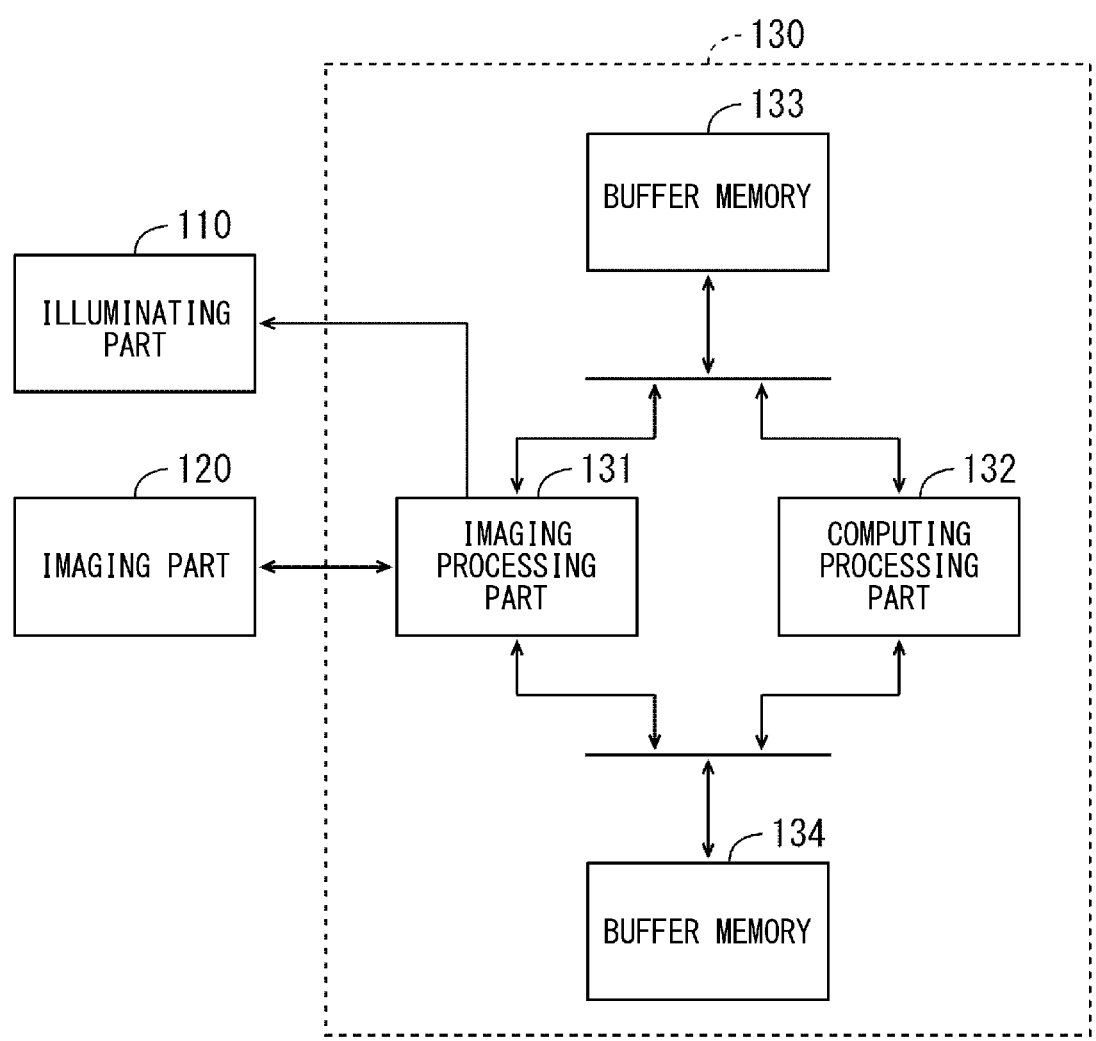
FIG. 5 is a block diagram illustrating a configuration of a computing part.

FIG. 5 is a block diagram illustrating a configuration of the computing part 130. As illustrated in FIG. 5, the computing part 130 includes an imaging processing part 131, a computing processing part 132, and buffer memories 133 and 134. In the present embodiment, the imaging processing part 131, the computing processing part 132, and the buffer memories 133 and 134 are implemented by an FPGA, but the present invention is not limited thereto. The imaging processing part 131 and the computing processing part 132 may be implemented by separate processing devices such as central computing processing devices (CPUs). Moreover, the buffer memory 133 and the buffer memory 134 may be implemented by separate memories such as random access memories (RAMs).

The imaging processing part 131 controls each of the illuminating parts 110 so as to successively emit several types of striped light and several types of coded light (hereinafter, referred to as series of structured light). Moreover, the imaging processing part 131 controls the imaging part 120 so as to generate a plurality of pieces of image data by successively imaging the measurement target S in synchronization with the emission of the series of structured light by each of the illuminating parts 110. In addition, the imaging processing part 131 acquires a plurality of pieces of image data generated by the imaging part 120, and causes the buffer memory 133 or the buffer memory 134 to store therein the plurality of pieces of image data.

The computing processing part 132 generates height data by performing a computation related to the plurality of pieces of image data stored in the buffer memory 133 or the buffer memory 134, and causes the relevant buffer memory 133 or 134 to store therein the generated height data. Moreover, the computing processing part 132 synthesizes a plurality of pieces of height data, thereby generating synthesized height data with the reduced unmeasurable portion. The computations performed by the computing processing part 132 include a relative phase computation, a spatial code computation, an absolute phase computation, and a height information computation.

In the relative phase computation, on the basis of image data corresponding to several types of striped light, a phase corresponding to the light receiving amount of light reflected from a reference height position when no measurement target S is present, and a phase corresponding to the light receiving amount of light reflected from the surface of the measurement target S when the measurement target S is present, are calculated. Moreover, a height of the measurement target S is calculated from a difference of these phases. With this computation, individual spatially cyclic stripes cannot be distinguished, and the uncertainty corresponding to an integral multiple of one cycle (2π) of stripe is present in the spatial phase. Accordingly, although an absolute height of the measurement target S is not calculated, it is possible to make a measurement resolving power high.

In the spatial code computation, on the basis of image data corresponding to several types of coded light, a code that has changed due to the measurement target S being present is acquired for every region in the measurement target S. A difference between the acquired code and a code when no measurement target S is present is obtained for every region, whereby a height of the measurement target S is calculated. With this computation, although the measurement resolving power is low, it is possible to calculate an absolute height of the measurement target S. Moreover, the computing amount in the spatial code computation is comparatively low, so that the burden to the computing processing part 132 is comparatively small.

In the absolute phase computation, by combining a result of the spatial code computation with a result of the relative phase computation, an absolute height of the measurement target S is calculated. In the height information computation, on the basis of a result of the absolute phase computation, height data of the measurement target S is generated.

Here, when both of the imaging processing part 131 and the computing processing part 132 simultaneously access the buffer memory 133 or the buffer memory 134, a processing speed of each of the imaging processing part 131 and the computing processing part 132 is lowered. Therefore, in the present embodiment, the connection relation between the imaging processing part 131 and the computing processing part 132, and the buffer memories 133 and 134 is dynamically switched, by a direct memory access controller (DMAC), for example.

Specifically, the connection relation is switched such that when one of the imaging processing part 131 and the computing processing part 132 has been accessed the buffer memory 133, the other of the imaging processing part 131 and the computing processing part 132 cannot access the buffer memory 133. Similarly, the connection relation is switched such that when one of the imaging processing part 131 and the computing processing part 132 has been accessed the buffer memory 134, the other of the imaging processing part 131 and the computing processing part 132 cannot access the buffer memory 134.

FIGS. 6A and 6B, FIGS. 7A and 7B, and FIGS. 8A and 8B are diagrams for explaining an operation of the computing part 130. As illustrated in FIG. 6A, first imaging processing is executed in a prescribed period. In the first imaging processing, the imaging processing part 131 controls the illuminating part 110A so as to successively emit a series of structured light and controls the imaging part 120 so as to generate a plurality of pieces of image data corresponding to the illuminating part 110A, and causes the buffer memory 133 to store therein the generated plurality of pieces of image data.

Thereafter, as illustrated in FIG. 6B, second imaging processing and first computing processing are concurrently executed in a prescribed period. In the second imaging processing, the imaging processing part 131 controls the illuminating part 110B so as to successively emit a series of structured light and controls the imaging part 120 so as to generate a plurality of pieces of image data corresponding to the illuminating part 110B, and causes the buffer memory 134 to store therein the generated plurality of pieces of image data. In the first computing processing, the computing processing part 132 generates first height data on the basis of the plurality of pieces of image data corresponding to the illuminating part 110A stored in the buffer memory 133, and causes the buffer memory 133 to store therein the first height data.

Thereafter, as illustrated in FIG. 7A, third imaging processing and second computing processing are concurrently executed in a prescribed period. In the third imaging processing, the imaging processing part 131 controls the illuminating part 110C so as to successively emit a series of structured light and controls the imaging part 120 so as to generate a plurality of pieces of image data corresponding to the illuminating part 110C, and causes the buffer memory 133 to store therein the generated plurality of pieces of image data. In the second computing processing, the computing processing part 132 generates second height data on the basis of the plurality of pieces of image data corresponding to the illuminating part 110B stored in the buffer memory 134, and causes the buffer memory 134 to store therein the second height data.

Thereafter, as illustrated in FIG. 7B, fourth imaging processing and third computing processing are concurrently executed in a prescribed period. In the fourth imaging processing, the imaging processing part 131 controls the illuminating part 110D so as to successively emit a series of structured light and controls the imaging part 120 so as to generate a plurality of pieces of image data corresponding to the illuminating part 110D, and causes the buffer memory 134 to store therein the generated plurality of pieces of image data. In the third computing processing, the computing processing part 132 generates third height data on the basis of the plurality of pieces of image data corresponding to the illuminating part 110C stored in the buffer memory 133, and causes the buffer memory 133 to store therein the third height data.

Thereafter, as illustrated in FIG. 8A, fourth computing processing is executed in a prescribed period. In the fourth computing processing, the computing processing part 132 generates fourth height data on the basis of the plurality of pieces of image data corresponding to the illuminating part 110D stored in the buffer memory 134, and causes the buffer memory 134 to store therein the fourth height data.

Thereafter, as illustrated in FIG. 8B, synthesizing processing is executed in a prescribed period. In the synthesizing processing, the computing processing part 132 synthesizes the first height data and third height data stored in the buffer memory 133 and the second height data and fourth height data stored in the buffer memory 134. With this synthesizing processing, synthesized height data with the reduced unmeasurable portion is generated.

Specifically, the first height data and the second height data respectively corresponding to the illuminating parts 110A and 110B that face each other are synthesized, whereby first synthesized height data with the reduced unmeasurable portion is generated. Moreover, the third height data and the fourth height data respectively corresponding to the illuminating parts 110C and 110D that face each other are synthesized, whereby second synthesized height data with the reduced unmeasurable portion is generated. In addition, the first synthesized height data and the second synthesized height data are synthesized, whereby final synthesized height data is generated.

(4) Effect

In the inspection device 300 according to the present embodiment, the illuminating parts 110A to 110D irradiate the measurement target S with the structured light from the mutually different first to fourth directions. Moreover, by receiving the light having reflected by the measurement target S, the imaging part 120 generates image data indicating an image of the measurement target S. The computing part 130 generates, on the basis of the image data generated by the imaging part 120, height data indicating a height image of the measurement target S.

In the computing part 130, the imaging processing part 131 executes the first imaging processing of causing the illuminating part 110A to emit structured light, causing the imaging part 120 to generate image data, and causing the buffer memory 133 to store therein the generated image data. The computing processing part 132 executes the first computing processing of generating, by performing the computation related to the image data stored in the buffer memory 133 in the first imaging processing, first height data corresponding to the first direction.

Concurrently with the first computing processing, the imaging processing part 131 executes the second imaging processing of causing the illuminating part 110B to emit structured light, causing the imaging part 120 to generate image data, and causing the buffer memory 134 to store therein the generated image data. The computing processing part 132 executes the second computing processing of generating, by performing the computation related to the image data stored in the buffer memory 134 in the second imaging processing, second height data corresponding to the second direction.

Concurrently with the second computing processing, the imaging processing part 131 executes the third imaging processing of causing the illuminating part 110C to emit structured light, causing the imaging part 120 to generate image data, and causing the buffer memory 133 to store therein the generated image data. The computing processing part 132 executes the third computing processing of generating, by performing the computation related to the image data stored in the buffer memory 133 in the third imaging processing, third height data corresponding to the third direction.

Concurrently with the third computing processing, the imaging processing part 131 executes the fourth imaging processing of causing the illuminating part 110D to emit structured light, causing the imaging part 120 to generate image data, and causing the buffer memory 134 to store therein the generated image data. The computing processing part 132 executes the fourth computing processing of generating, by performing the computation related to the image data stored in the buffer memory 134 in the fourth imaging processing, fourth height data corresponding to the fourth direction.

In this manner, the first computing processing and the second imaging processing are concurrently executed, the second computing processing and the third imaging processing are concurrently executed, and the third computing processing and the fourth imaging processing are concurrently executed. Here, the first computing processing and the second imaging processing are executed respectively using the different buffer memories 133 and 134. The second computing processing and the third imaging processing are executed respectively using the different buffer memories 134 and 133. The third computing processing and the fourth imaging processing are executed respectively using the different buffer memories 133 and 134.

With this configuration, the processing speed of each of the imaging processing part 131 and the computing processing part 132 is not lowered. Therefore, it is possible to generate a large number of height data in a short time. Moreover, the computing processing part 132 executes the synthesizing processing of generating synthesized height data with a reduced unmeasurable portion, by synthesizing a plurality of pieces of height data. In this case, it is possible to easily inspect a portion over the wide range of the measurement target S, using the synthesized height data.

(5) Modification Example

In the present embodiment, the synthesizing processing of synthesizing the first to fourth height data after the fourth computing processing is executed, but the present invention is not limited thereto. For example, when the execution time of each computing processing is shorter than the execution time of each imaging processing, synthesizing processing of synthesizing two or more pieces of height data may be executed as appropriate after each imaging processing.

Figure 9A:
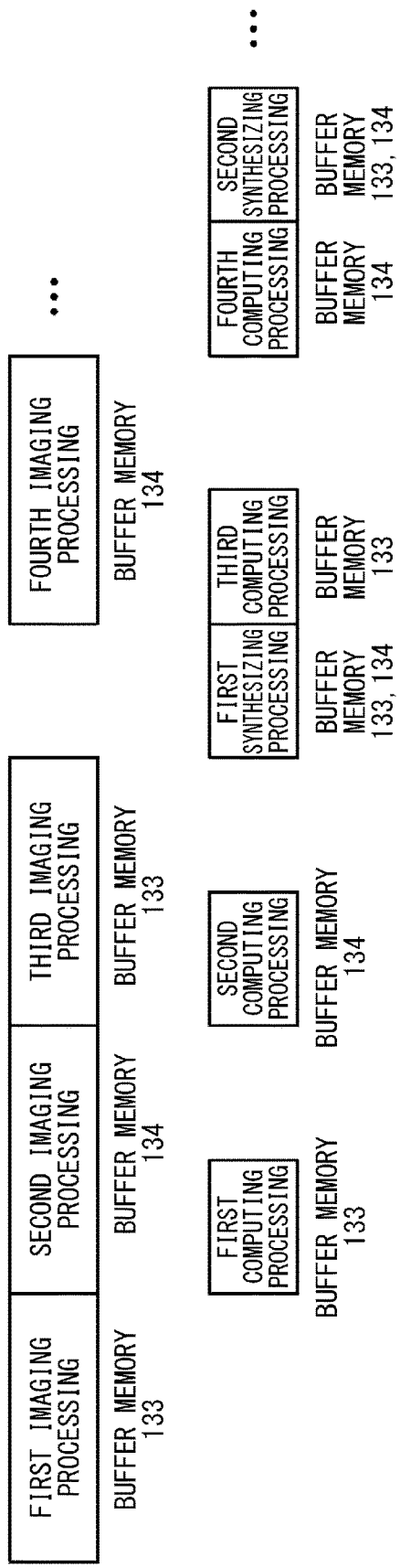
FIGS. 9A and 9B are time charts illustrating operations of the computing part in first and second modification examples.
Figure 9B:
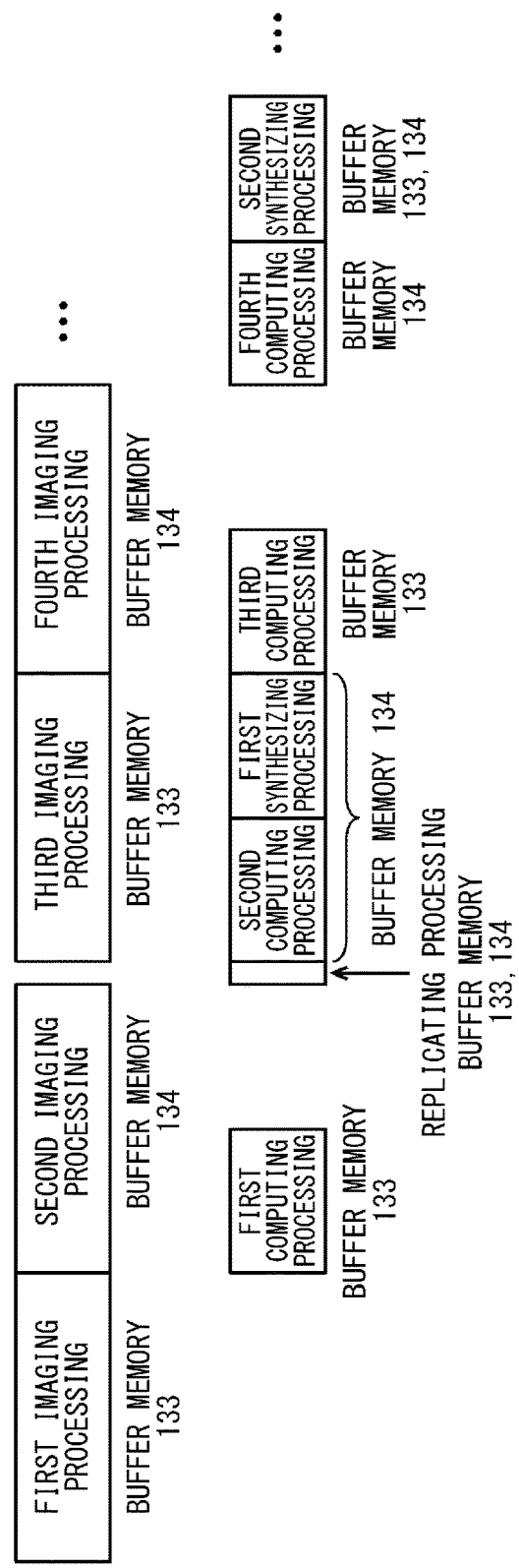

FIGS. 9A and 9B are time charts illustrating operations of the computing part 130 in first and second modification examples, respectively. Note that, below each processing in FIGS. 9A and 9B, the buffer memory to be used in the processing is illustrated for distinction. The same applies to FIG. 10, which is described later.

As illustrated in FIG. 9A, in the first modification example, first synthesizing processing is executed between the third imaging processing and the fourth imaging processing. In the first synthesizing processing, the computing processing part 132 synthesizes the first height data stored in the buffer memory 133 with the second height data stored in the buffer memory 134, thereby generating first synthesized height data.

After the fourth computing processing, second synthesizing processing is executed. In the second synthesizing processing, the computing processing part 132 synthesizes the third height data stored in the buffer memory 133 and the fourth height data stored in the buffer memory 134, thereby generating second synthesized height data. Moreover, the computing processing part 132 synthesizes the second synthesized height data with the first synthesized height data generated in the first synthesizing processing, thereby generating final synthesized height data.

As illustrated in FIG. 9B, in the second modification example, replicating processing is executed between the second imaging processing and the third imaging processing. In the replicating processing, the computing processing part 132 replicates (or may move) the first height data stored in the buffer memory 133, in the buffer memory 134. In this case, in the first synthesizing processing, the buffer memory 134 is used, the buffer memory 133 does not need to be used.

Accordingly, it is possible to concurrently execute the third imaging processing that uses the buffer memory 133, the second computing processing and the first synthesizing processing that use the buffer memory 134. Moreover, the processing speed of each of the imaging processing part 131 and the computing processing part 132 is not lowered. Therefore, it is possible to generate synthesized height data in a shorter time.

Figure 10:
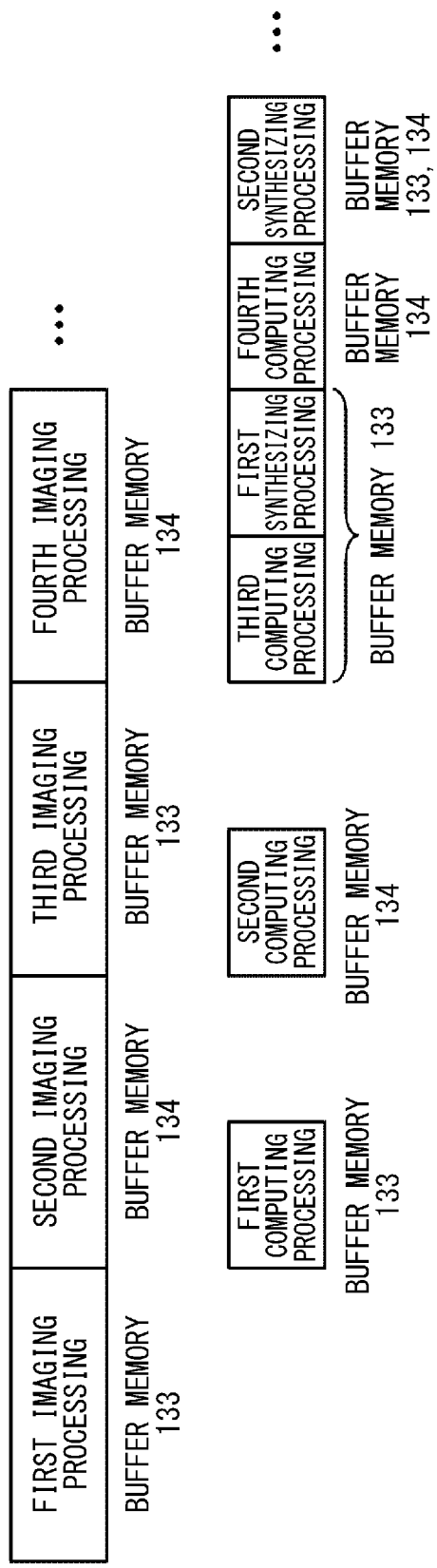
FIG. 10 is a time chart illustrating an operation of the computing part in a third modification example.

FIG. 10 is a time chart illustrating an operation of the computing part 130 in a third modification example. As illustrated in FIG. 10, in the third modification example, the first imaging processing is firstly executed. The first imaging processing in the present example is similar to the first imaging processing in FIG. 6A.

Thereafter, the second imaging processing and the first computing processing are concurrently executed in a prescribed period. In the second imaging processing, the imaging processing part 131 controls not the illuminating part 110B but the illuminating part 110C so as to successively emit a series of structured light and controls the imaging part 120 so as to generate a plurality of pieces of image data corresponding to the illuminating part 110C, and causes the buffer memory 134 to store therein the generated plurality of pieces of image data. The first computing processing in the present example is similar to the first computing processing in FIG. 6B.

Thereafter, the third imaging processing and the second computing processing are concurrently executed in a prescribed period. In the third imaging processing, the imaging processing part 131 controls not the illuminating part 110C but the illuminating part 110B so as to successively emit a series of structured light and controls the imaging part 120 so as to generate a plurality of pieces of image data corresponding to the illuminating part 110B, and causes the buffer memory 133 to store therein the generated plurality of pieces of image data. In the second computing processing, the computing processing part 132 generates third height data on the basis of the plurality of pieces of image data corresponding to the illuminating part 110C stored in the buffer memory 134, and causes the buffer memory 134 to store therein the third height data.

Thereafter, the fourth imaging processing, the third computing processing, and the first synthesizing processing are concurrently executed in a prescribed period. The fourth imaging processing in the present example is similar to the fourth imaging processing in FIG. 7B. In the third computing processing, the computing processing part 132 generates second height data on the basis of the plurality of pieces of image data corresponding to the illuminating part 110B stored in the buffer memory 133, and causes the buffer memory 133 to store therein the second height data. In the first synthesizing processing, the computing processing part 132 synthesizes the first height data and the second height data stored in the buffer memory 133, thereby generating first synthesized height data.

Thereafter, the fourth computing processing is executed in a prescribed period. The fourth computing processing in the present example is similar to the fourth computing processing in FIG. 8A. Thereafter, the second synthesizing processing is executed in a prescribed period. The second synthesizing processing in the present example is similar to the second synthesizing processing in the first and second modification examples.

In this manner, in the first synthesizing processing in the present example, the buffer memory 133 is used, and the buffer memory 134 does not need to be used. Accordingly, it is possible to concurrently execute the fourth imaging processing that uses the buffer memory 134, the third computing processing and the first synthesizing processing that use the buffer memory 133. Therefore, it is possible to generate synthesized height data in a shorter time.

[2] Second Embodiment

Figure 11:
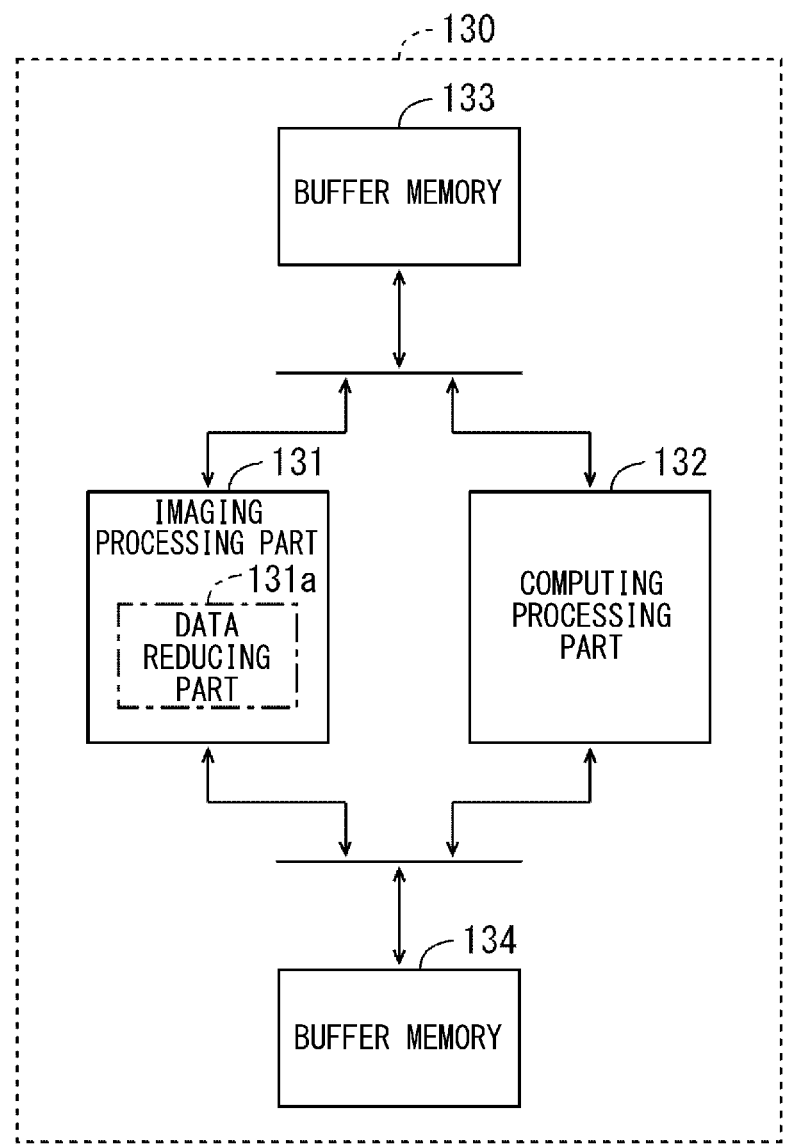
FIG. 11 is a block diagram illustrating a configuration of the computing part according to a second embodiment of the present invention.

As for the inspection device 300 according to a second embodiment, different points from the inspection device 300 according to the first embodiment are explained. FIG. 11 is a block diagram illustrating a configuration of the computing part 130 according to the second embodiment of the present invention. In the present embodiment, as illustrated in FIG. 11, the imaging processing part 131 includes a data reducing part 131a. The data reducing part 131a performs image processing of image data generated by the imaging part 120, thereby reducing the data amount of the image data. Such image processing includes binning processing, for example.

Figure 12:
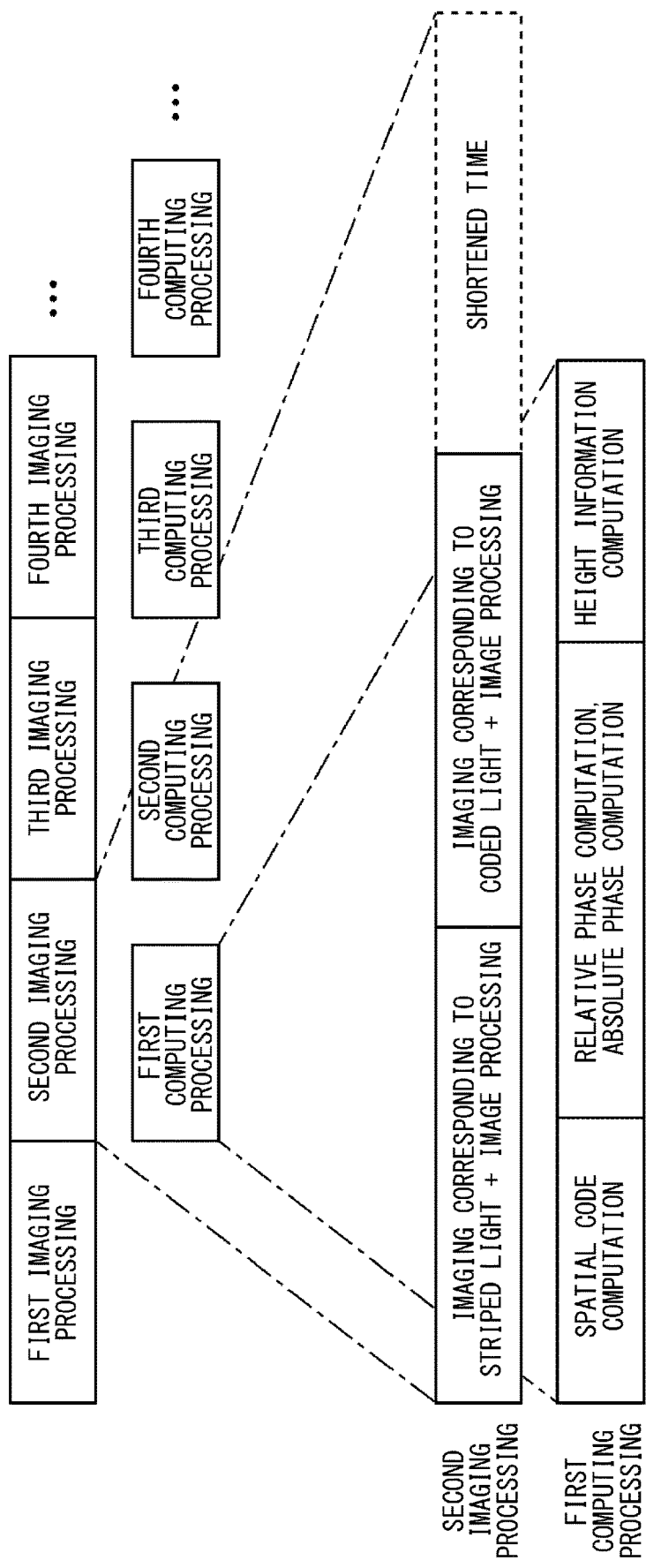
FIG. 12 is a diagram for explaining an operation of the computing part in the second embodiment.

FIG. 12 are diagrams for explaining an operation of the computing part 130 in the second embodiment. FIG. 12 illustrates a time chart illustrating the operation of the computing part 130 in the first embodiment, for the purpose of reference. As illustrated in FIG. 12, in the first embodiment, the execution time of each imaging processing tends to be longer than the execution time of each computing processing.

In the present embodiment, as illustrated in FIG. 12, the imaging processing part 131 controls the illuminating part 110 and the imaging part 120 such that imaging corresponding to the striped light is performed at each imaging processing. Accordingly, a plurality of pieces of image data corresponding to the striped light are generated. The data reducing part 131a performs image processing to the generated plurality of pieces of image data corresponding to the striped light, and causes the buffer memory 133 or the buffer memory 134 to store therein the plurality of pieces of image data after the image processing corresponding to the striped light.

Moreover, the imaging processing part 131 controls the illuminating part 110 and the imaging part 120 such that imaging corresponding to the coded light is performed at each imaging processing. Accordingly, the plurality of pieces of image data corresponding to the coded light are generated. The data reducing part 131a performs image processing to the generated plurality of pieces of image data corresponding to the coded light, and causes the buffer memory 133 or the buffer memory 134 to store therein the plurality of pieces of image data after the image processing corresponding to the coded light.

This operation reduces the data amount of the plurality of pieces of image data, and thus shortens the transfer time of the image data to the buffer memories 133 and 134. This can shorten the execution time of each imaging processing. FIG. 12 illustrates a shortened time relative to the imaging processing in the first embodiment by a dashed line. In the present embodiment, it is possible to make the execution time of each imaging processing shorter than the execution time of each computing processing. Moreover, the data amount of the plurality of pieces of image data is reduced, thereby speeding up the computation related to the image data. As these results, it is possible to generate height data in a shorter time.

Note that, although FIG. 12 illustrates the time chart of the second imaging processing as a representative of the first to fourth imaging processing, the time charts of the other imaging processing are similar to the time chart of the second imaging processing. Moreover, although FIG. 12 illustrates the time chart of the first computing processing as a representative of the first to fourth computing processing, the time charts of the other computing processing are similar to the time chart of the first computing processing. In each imaging processing, either of the imaging corresponding to the striped light and the image processing thereof, and the imaging corresponding to the coded light and the image processing thereof, may be executed first.

[3] Third Embodiment

Figure 13:
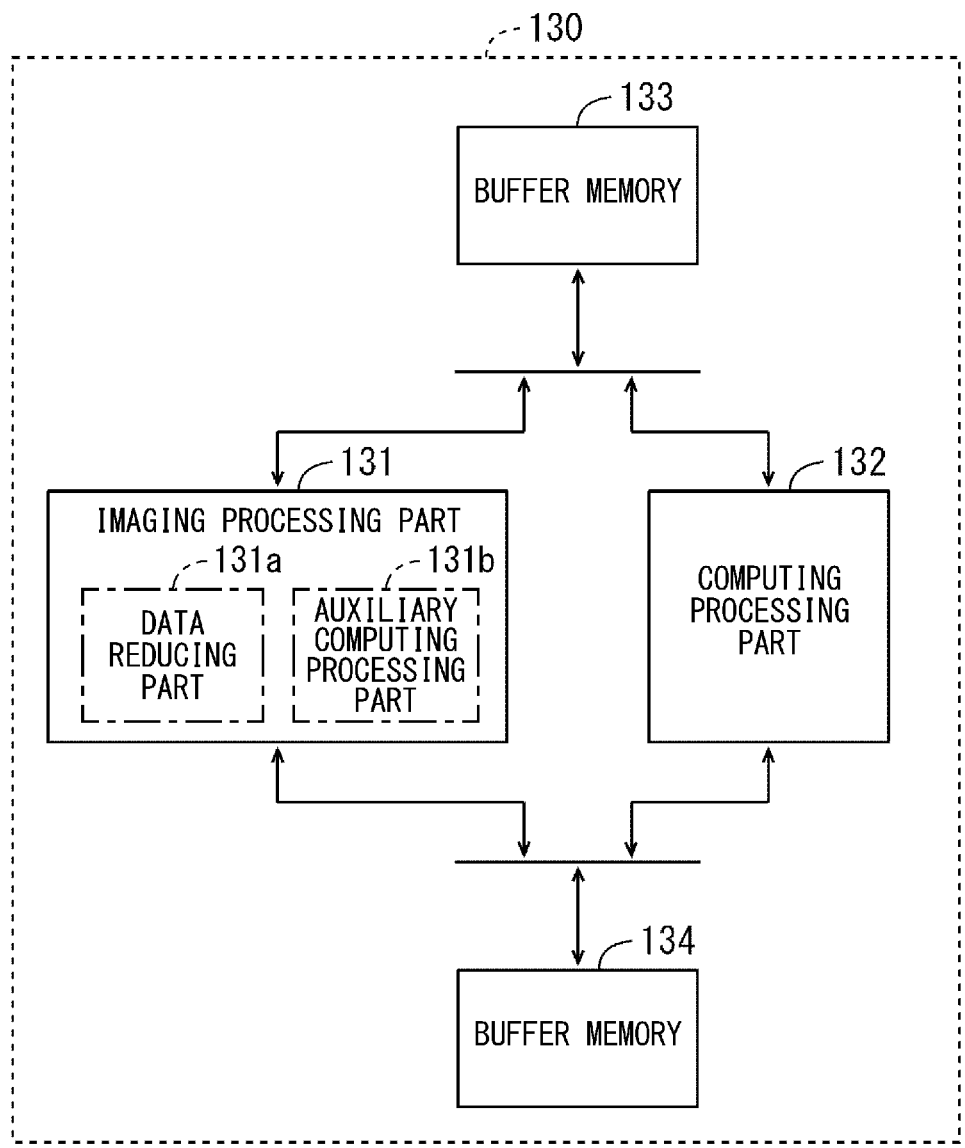
FIG. 13 is a block diagram illustrating a configuration of the computing part according to a third embodiment of the present invention.
Figure 14:
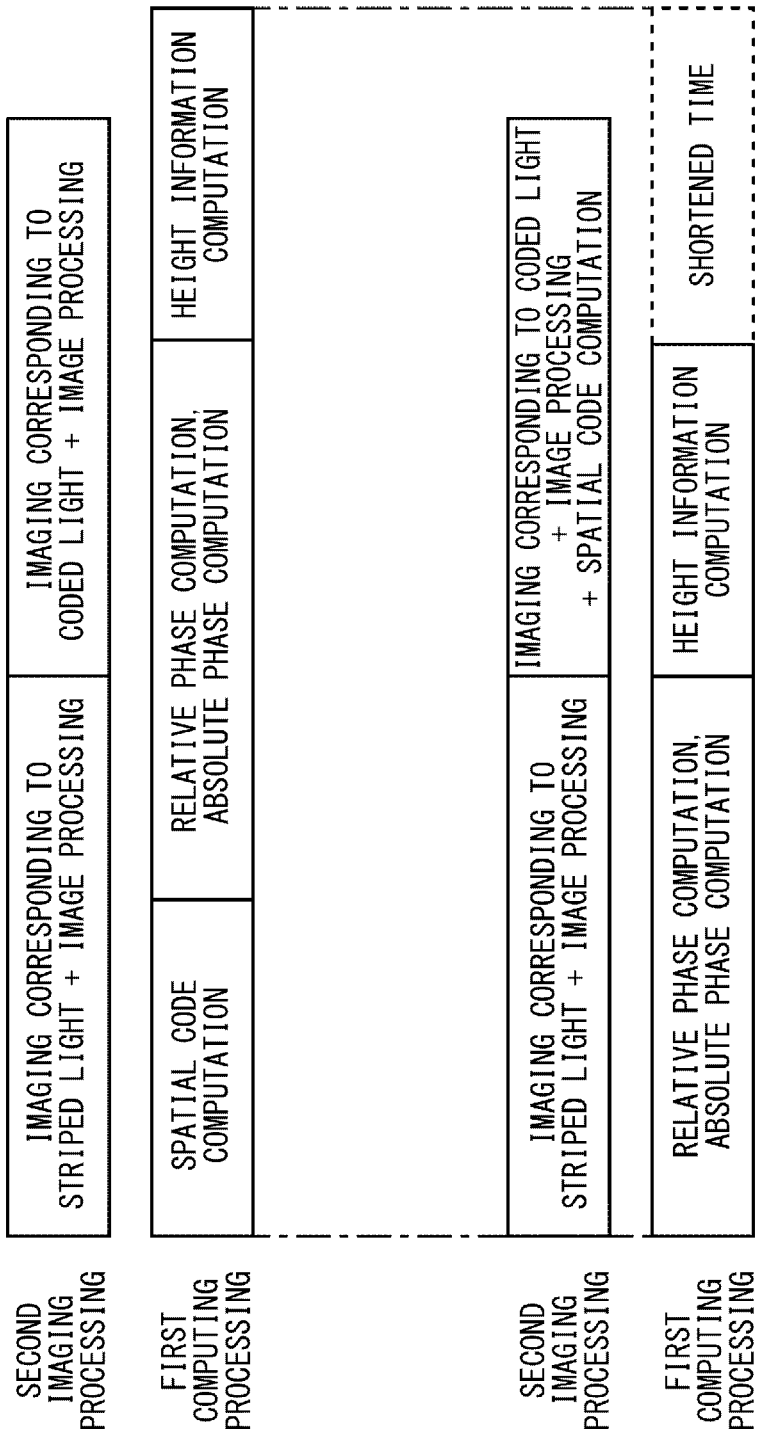
FIG. 14 is a diagram for explaining an operation of the computing part in the third embodiment.

As for the inspection device 300 according to a third embodiment, different points from the inspection device 300 according to the second embodiment are explained. FIG. 13 is a block diagram illustrating a configuration of the computing part 130 according to the third embodiment of the present invention. FIG. 14 is a diagram for explaining an operation of the computing part 130 in the third embodiment. FIG. 14 illustrates the time chart illustrating the operation of the computing part 130 in the second embodiment, for the purpose of reference. As illustrated in FIG. 13, the imaging processing part 131 further includes, in addition to the data reducing part 131a, an auxiliary computing processing part 131b.

In the present embodiment, similar to the second embodiment, the data reducing part 131a reduces the data amount of a plurality of pieces of image data. This shortens the transfer time of the image data to the buffer memories 133 and 134. Meanwhile, the time during when image data is transferred from the imaging part 120 to the imaging processing part 131 is constant. Accordingly, the transfer time of image data is shorted to generate a prescribed standby time in the imaging processing part 131. In other words, a time margin for performing another processing is generated in the imaging processing part 131.

Therefore, the auxiliary computing processing part 131*b* executes a part of a computation for generating height data. The computing processing ability of the auxiliary computing processing part 131*b* may be lower than the computing processing ability of the computing processing part 132. In the present embodiment, as illustrated in FIG. 14, the auxiliary computing processing part 131*b* executes, among a spatial code computation, a relative phase computation, an absolute phase computation, and a height information computation, the spatial code computation with the comparatively less computing amount. The relevant spatial code computation is completed within the abovementioned standby time. Accordingly, even when the auxiliary computing processing part 131*b* performs the spatial code computation, the execution time of the imaging processing does not change.

With this operation, the computing processing part 132 only needs to perform the relative phase computation, the absolute phase computation, and the height information computation, and does not need to perform the spatial code computation. This can shorten the execution time of each computing processing. FIG. 14 illustrates a shortened time relative to the computing processing in the second embodiment by a dashed line. As a result, it is possible to generate height data in a further shorter time.

Note that, although FIG. 14 illustrates the time chart of the second imaging processing is illustrated as a representative of the first to fourth imaging processing, the time charts of the other imaging processing are similar to the time chart of the second imaging processing. Moreover, although FIG. 14 illustrates the time chart of the first computing processing as a representative of the first to fourth computing processing, the time charts of the other computing processing are similar to the time chart of the first computing processing.

In each imaging processing, either of the imaging corresponding to the striped light and the image processing thereof, and the imaging corresponding to the coded light, the image processing thereof, and the spatial code computation, may be executed first. When the imaging corresponding to the coded light, the image processing thereof, and the spatial code computation are executed first, it is possible to more easily secure a time for executing the spatial code computation without changing the execution time of the imaging processing.

[4] Other Embodiments (a) In the abovementioned embodiments, a plurality of pieces of height data are synthesized, whereby synthesized height data is generated, but the present invention is not limited thereto. A plurality of pieces of height data may be used for an inspection of the measurement target S without by being synthesized.

(b) In the abovementioned embodiments, the head part 100 includes the four illuminating parts 110A to 110D, but the present invention is not limited thereto. The head part 100 may include the two illuminating parts 110A and 110B, or may include the illuminating parts 110 of an arbitrary number, that is three or more.

[5] Correspondence Relation Between Each Component in Claims and Each Unit in Embodiments A correspondence relation between each component in claims and each unit in embodiments is explained. In the abovementioned embodiments, the measurement target S is an example of the measurement target, the illuminating parts 110A to 110D are respectively examples of the first to fourth illuminating parts, and the imaging part 120 is an example of the imaging part. The computing part 130 is an example of the computing part, the imaging processing part 131 is an example of the imaging processing part, the computing processing part 132 is an example of the computing processing part, and the buffer memories 133 and 134 are respectively examples of the first and second buffer memories. The inspection device 300 is an example of the inspection device, the data reducing part 131*a* is an example of the data reducing part, and the auxiliary computing processing part 131*b* is an example of the auxiliary computing processing part.

What is claimed is:

1. An inspection device comprising:
   a first illuminating part configured to irradiate a measurement target with a series of structured light from a first direction;
   a second illuminating part configured to irradiate the measurement target with a series of structured light from a second direction different from the first direction, wherein the structured light irradiated by the first illuminating part and the second illuminating part include several types of striped light and several types of coded light;
   an imaging part configured to generate, by receiving light reflected from the measurement target, image data indicating a plurality of pieces of image data by successively imaging the measurement target in synchronization with the emission of the series of the structured light; and
   a computing part configured to generate, on the basis of the image data generated by the imaging part, height data indicating a height image of the measurement target, wherein
   the computing part includes an imaging processing part, a computing processing part, a first buffer memory, and a second buffer memory,
   the imaging processing part executes first imaging processing of causing the first illuminating part to emit the series of structured light, the imaging part to generate the plurality of pieces of image data, and the first buffer memory to store therein the generated plurality of pieces of image data,
   the computing processing part executes first computing processing of generating, by performing a computation related to the plurality of pieces of image data stored in the first buffer memory in the first imaging processing, first height data as height data corresponding to the first direction,
   the imaging processing part executes second imaging processing of causing the second illuminating part to emit the series of structured light, causing the imaging part to generate the plurality of pieces of image data, and causing the second buffer memory to store therein the generated plurality of pieces of image data, concurrently with the first computing processing, and
   the computing processing part executes second computing processing of generating, by performing a computation related to the plurality of pieces of image data stored in the second buffer memory in the second imaging processing, second height data as height data corresponding to the second direction, wherein the first computing processing and the second computing processing include a relative phase computation on the basis of image data corresponding to several types of striped light, spatial code computation on the basis of image data corresponding to several types of coded light, an absolute phase computation by combining a result of the spatial code computation with a result of the relative phase computation and a height information computation on the basis of the result of the absolute phase computation.

2. The inspection device according to claim 1, wherein the imaging processing part includes a data reducing part configured to reduce a data amount of the plurality of pieces of image data generated by the imaging part in the first and second imaging processing, and the data reducing part causes the first buffer memory to store therein the plurality of pieces of image data with the reduced data amount in the first imaging processing, and causes the second buffer memory to store therein the image data with the reduced data amount in the second imaging processing.

3. The inspection device according to claim 2, wherein the imaging processing part further includes an auxiliary computing processing part, and the auxiliary computing processing part generates a part of the first height data, by performing a computation related to the plurality of pieces of image data stored in the first buffer memory and with the reduced data amount in the first imaging processing, and generates a part of the second height data, by performing a computation related to the plurality of pieces of image data stored in the second buffer memory and with the reduced data amount in the second imaging processing.

4. The inspection device according to claim 1, wherein the computing processing part further executes synthesizing processing of generating synthesized height data with a reduced unmeasurable portion, by synthesizing the first height data and the second height data.

5. The inspection device according to claim 1, further comprising:
a third illuminating part configured to irradiate the measurement target with structured light from a third direction different from the first and second directions; and
a fourth illuminating part configured to irradiate the measurement target with structured light from a fourth direction different from the first, second, and third directions, wherein the imaging processing part executes third imaging processing of causing the third illuminating part to emit structured light, causing the imaging part to generate the plurality of pieces of image data, and causing the first buffer memory to store therein the generated plurality of pieces of image data, concurrently with the second computing processing, and the computing processing part executes third computing processing of generating, by performing a computation related to the plurality of pieces of image data stored in the first buffer memory in the third imaging processing, third height data as height data corresponding to the third direction, the imaging processing part executes fourth imaging processing of causing the fourth illuminating part to emit structured light, causing the imaging part to generate the plurality of pieces of image data, and causing the second buffer memory to store therein the generated plurality of pieces of image data, concurrently with the third computing processing, and the computing processing part executes fourth computing processing of generating, by performing a computation related to the plurality of pieces of image data stored in the second buffer memory in the fourth imaging processing, fourth height data as height data corresponding to the fourth direction.

6. The inspection device according to claim 5, wherein the computing processing part further executes synthesizing processing of generating synthesized height data with a reduced unmeasurable portion, by synthesizing the first height data, the second height data, the third height data, and the fourth height data.

7. The inspection device according to claim 6, wherein the computing processing part executes a part of the synthesizing processing before the fourth imaging processing, and executes the remaining part of the synthesizing processing after the fourth imaging processing.

8. The inspection device according to claim 7, wherein the computing processing part causes the second buffer memory to store therein the first height data stored in the first buffer memory, and executes a part of the synthesizing processing using the first height data and the second height data stored in the second buffer memory, and the imaging processing part executes the third imaging processing that uses the first buffer memory, concurrently with the second computing processing and the part of the synthesizing processing that use the second buffer memory.

* * * * *